(12) United States Patent
Fischer

(10) Patent No.: US 6,986,529 B2
(45) Date of Patent: Jan. 17, 2006

(54) AIR BAG MODULE WITH VENT

(75) Inventor: Kurt F. Fischer, Oxford, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/128,101

(22) Filed: Apr. 23, 2002

(65) Prior Publication Data

US 2003/0197356 A1    Oct. 23, 2003

(51) Int. Cl.
  *B60R 21/32*    (2006.01)

(52) U.S. Cl. .................................................. 280/735
(58) Field of Classification Search ............... 280/735, 280/734, 801.1; 180/271, 282, 273, 268
See application file for complete search history.

(56) References Cited

U.S. PATENT DOCUMENTS

| | | | |
|---|---|---|---|
| 5,074,583 A | 12/1991 | Fujita et al. | |
| 5,413,378 A | 5/1995 | Steffens, Jr. et al. | |
| 5,626,359 A | 5/1997 | Steffens, Jr. et al. | |
| 5,695,214 A | 12/1997 | Faigle et al. | |
| 5,707,078 A | 1/1998 | Swanberg et al. | |
| 5,742,986 A | 4/1998 | Corrion et al. | |
| 5,769,452 A | 6/1998 | Yoshida | |
| 5,871,231 A | 2/1999 | Richards et al. | |
| 6,219,605 B1 | 4/2001 | Bauer et al. | |
| 6,290,257 B1 * | 9/2001 | Bunce et al. | 280/739 |
| 6,341,252 B1 | 1/2002 | Foo et al. | |
| 6,390,501 B1 * | 5/2002 | Greib et al. | 280/743.2 |
| 6,533,317 B2 * | 3/2003 | Kath | 280/735 |
| 2001/0024032 A1 | 9/2001 | Breed et al. | |

FOREIGN PATENT DOCUMENTS

| | | |
|---|---|---|
| DE | 19820212 A1 | 11/1999 |
| EP | 0357225 | 3/1990 |
| EP | 1031475 A2 | 8/2000 |

* cited by examiner

*Primary Examiner*—Faye M. Fleming
(74) *Attorney, Agent, or Firm*—Tarolli, Sundheim, Covell & Tummino L.L.P.

(57) ABSTRACT

A vehicle occupant protection apparatus (10) comprises a seat belt system (50) having a buckled condition and an unbuckled condition, and a sensor (56) for determining the buckled condition of the seat belt system. An inflatable occupant protection device (12) has a deflated condition and an inflated condition. An inflator (32) is actuatable to provide inflation fluid to inflate the inflatable device (12). The protection apparatus (10) includes an electrically energizable mechanism (44) for venting inflation fluid from the protection apparatus (10). Electric circuitry (40) is responsive to a determination of the buckled condition of the seat belt system (50) and the inflated condition of the inflatable device (12), for actuating the electrically energizable mechanism (44) to vent inflation fluid.

31 Claims, 6 Drawing Sheets

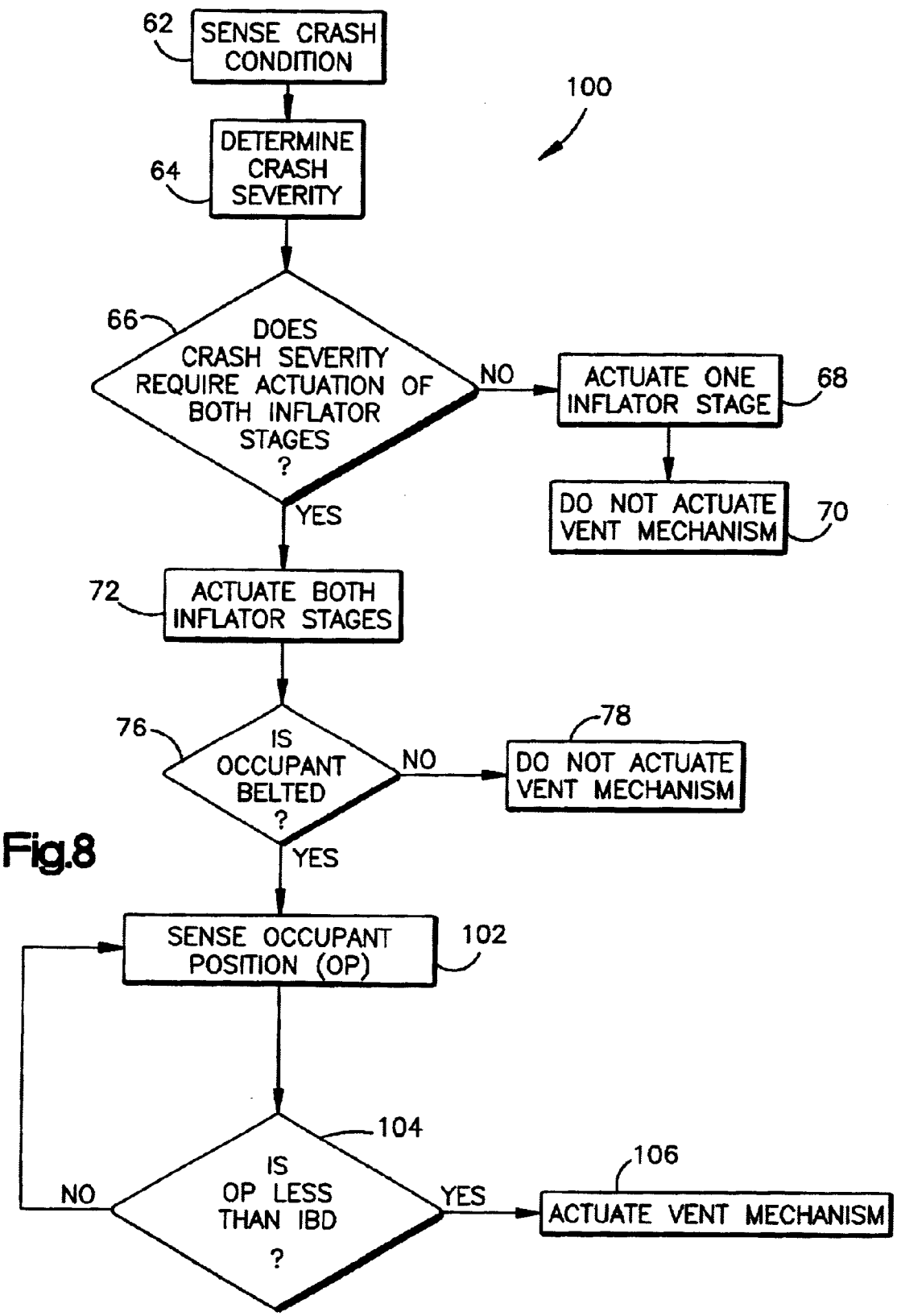

AIR BAG MODULE WITH VENT

BACKGROUND OF THE INVENTION

The present invention relates to a vehicle occupant protection apparatus. In particular, the present invention relates to an air bag having a vent that can be selectively opened to discharge inflation fluid.

DESCRIPTION OF RELATED ART

It is known to provide an air bag module with a vent. The vent opens, or is uncovered, when the air bag inflates to help protect a vehicle occupant, to discharge inflation fluid from the inflated air bag. In some air bag modules, the vent may be selectively opened depending on sensed factors, such as, whether the occupant's seat belt is buckled. U.S. Pat. Nos. 6,290,257 and 5,707,078 show such air bag modules. U.S. Pat. No. 5,695,214 shows an air bag module with a housing having a vent opening that may be opened to vent fluid, either before, during, or after actuation of the inflator.

SUMMARY OF THE INVENTION

The present invention is a vehicle occupant protection apparatus comprising a seat belt system for helping to protect an occupant of a vehicle seat. The seat belt system has a buckled condition and an unbuckled condition. The apparatus also includes means for determining the buckled condition of the seat belt system. The apparatus further includes an inflatable vehicle occupant protection device having a deflated condition and an inflated condition for helping to protect the occupant of the vehicle seat, and an inflator actuatable to provide inflation fluid to inflate the inflatable device. The apparatus includes means for determining the inflated condition of the inflatable device, and an electrically energizable mechanism for venting inflation fluid from the protection apparatus. The apparatus also includes vehicle electric circuitry, responsive to a determination of the buckled condition of the seat belt system and the inflated condition of the inflatable device, for actuating the electrically energizable mechanism to vent inflation fluid from the protection apparatus.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 8 is a flow chart, similar to FIG. 5, of a process in accordance with a third embodiment of the invention.

DETAILED DESCRIPTION OF THE INVENTION

The present invention relates to a vehicle occupant protection apparatus including an inflatable vehicle occupant protection device, such as an air bag. In particular, the present invention relates to an air bag module in which inflation fluid is selectively vented from the module in order to control the speed and force of deployment of the inflating air bag.

Figure 1:
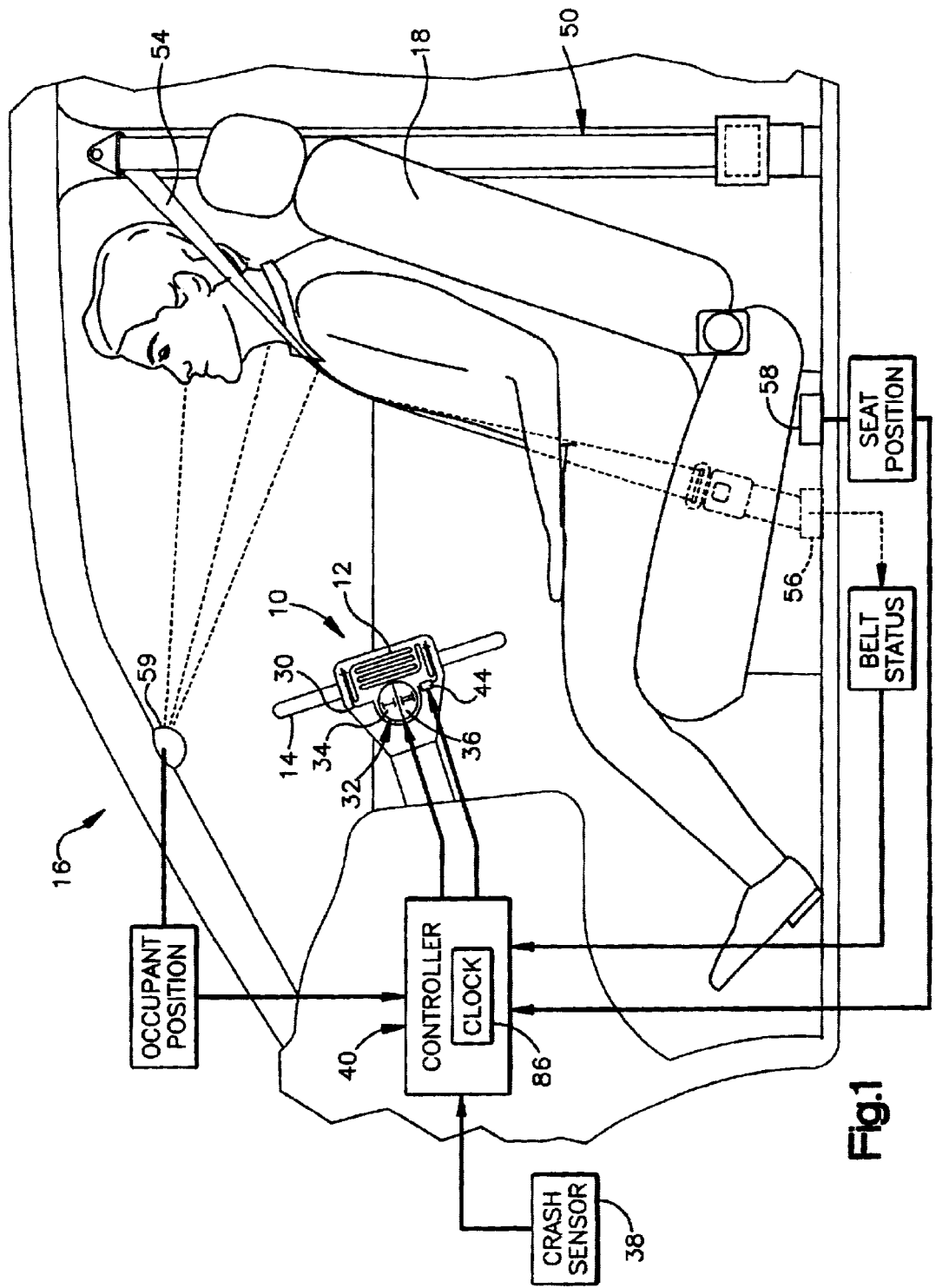
FIG. 1 is a schematic illustration, partially in section, of a vehicle occupant protection apparatus constructed in accordance with a first embodiment of the present invention.

As representative of the present invention, FIG. 1 illustrates a vehicle occupant protection apparatus, or air bag module, 10 that is constructed in accordance with a first embodiment of the invention. The apparatus 10 includes an inflatable vehicle occupant protection device 12 of the type commonly known as an air bag. Other occupant protection devices that can be used in accordance with the invention include, for example, inflatable knee bolsters, inflatable headliners, inflatable side curtains, knee bolsters actuatable by air bags, and seat belt pretensioners.

The air bag module 10 is mounted in a steering wheel 14 of a vehicle 16. The vehicle 16 has a driver's seat 18 located rearward of the steering wheel 14. The air bag 12 is inflatable to a position for helping to protect an occupant of the seat 18, i.e., the driver of the vehicle 16. The present invention is also applicable to an air bag module that is mounted in another part of the vehicle 16 than the steering wheel 14, for example, the vehicle instrument panel, for helping to protect an occupant of a vehicle seat other than the driver's seat 18.

The air bag 12 is stored in a folded, deflated condition within a housing, or reaction canister, 30. The reaction canister 30 is illustrated as being a separate structure supported on the vehicle steering wheel 14. The reaction canister 30 may alternatively be a part of the steering wheel 14 itself. The term "reaction canister" is used herein to include a reaction canister, a housing, a reaction plate, or similar structure, but not the air bag itself.

The apparatus 10 also includes an inflator 32. The inflator 32 is actuatable to provide inflation fluid for inflating the air bag 12. The inflator 32 may contain an ignitable gas-generating material, which, when ignited, rapidly generates a large volume of gas. The inflator 32 may alternatively contain a stored quantity of pressurized inflation fluid, or a combination of pressurized inflation fluid and ignitable material for heating the inflation fluid.

The inflator 32 shown in FIG. 1 includes two separate inflation fluid sources, or stages 34 and 36. The stages 34 and 36 are actuatable separately or together, in a known manner, to provide inflation fluid in differing amounts depending on crash severity. If a low severity crash is sensed, for example, only one stage 34 or 36 of the inflator 32 might be actuated, while both stages 34 and 36 might be actuated in a high severity crash.

A crash sensor 38 is included within the occupant protection apparatus 10 to sense a vehicle crash event and output a signal indicative of the crash event. The crash sensor 38 may take any suitable form, such as an acoustic crash sensor or inertia switch (accelerometer), that outputs a signal indicative of a crash condition, such as crash acceleration or other crash metric. In a preferred embodiment, the output of the crash sensor 38 is indicative of crash acceleration (vehicle deceleration). The output of the crash sensor 38 is continuous, that is, is indicative of crash condition over the duration of a crash event. The output of the crash sensor 38 is continuous, that is, is indicative of crash condition over the duration of a crash event.

A controller 40 receives the signal from the crash sensor 38. The signal output by the crash sensor 38 is used by the controller 40 to determine if a crash event is occurring and, if so, its severity. The controller 40 is typically a microcomputer or microprocessor. Alternatively, the controller 40 may be provided by one or more digital and/or analog circuits. Also, the controller 40 may be provided within an application specific integrated circuit.

The controller 40 controls actuation of the air bag inflator 32. The controller 40 is operatively connected to the first and second stages 34 and 36 of the inflator 32 to provide an appropriate actuating (ignition) signal to one or both stages of the inflator. The controller 40 also includes means for determining an inflated condition of the air bag 12, as described below.

The occupant protection apparatus 10 includes a vent mechanism indicated schematically at 44 that is connected with the reaction canister 30. The vent mechanism 44 is an electrically actuatable mechanism that, when actuated, enables venting of inflation fluid from the protection apparatus 10. The vent mechanism 44 may take any of a variety of known forms, such as an electrically controlled regulator or valve or openable door that responds to a control signal, in a known manner. The vent mechanism 44 could vent inflation fluid from the air bag 12 rather than from the reaction canister 30. The vent mechanism 44 may be a portion of the reaction canister 30 that is forcibly and rapidly removed from the remainder of the reaction canister, to create a vent opening. As noted above, the term "reaction canister" is used herein to include a reaction canister, a housing, a reaction plate, or similar structure. Therefore, the vent mechanism 44 may be formed in or operable on any of these structures that is included in the air bag module 10.

The seat 18 includes a seat belt system 50 for helping to protect an occupant of the seat. The seat belt system 50 is of a known type including a lap belt (not shown) and a torso belt, or shoulder belt, 54. The seat belt system 50 also includes a seat belt usage sensor indicated schematically at 56. The sensor 56 outputs a signal that can be used to determine whether an occupant of the seat 18 is buckled in the seat belt system 50. The sensor 56 may be a belt tension sensor; a buckle switch that senses the presence of a tongue in a buckle; a load sensor in the buckle or retractor that senses the presence of a load as indicative of a belted occupant; or a belt stowage sensor that senses the amount of webbing stored on a retractor spool. Each of these factors is indicative of a belted occupant. The output of the sensor 56 is provided to the controller 40 for use in making a determination of whether to actuate the vent mechanism 44.

The vehicle also includes an occupant position sensor mechanism. The output of the occupant position sensor mechanism is provided to the controller 40 for use in making a determination of whether to actuate the vent mechanism 44.

The occupant position sensor mechanism may include any type of sensor for determining directly or inferentially the fore and aft position of the occupant relative to the steering wheel 14. In the particular embodiment shown in the drawings, the occupant position sensor mechanism includes a seat position sensor 58 that is operative to sense the fore and aft position of the seat 18 in the vehicle, relative to the steering wheel 14. The sensor 58 may be connected between the seat 18 and the seat tracks or vehicle floor pan, for example. The fore and aft position of the seat 18 is indicative of how far away the occupant is from the steering wheel 14 and from the reaction canister 30 mounted on the steering wheel. In addition, the occupant position sensor mechanism includes an occupant ranging sensor indicated schematically at 59, that uses reflected sound or light to determine the position of the occupant relative to the steering wheel 14.

Figure 2:
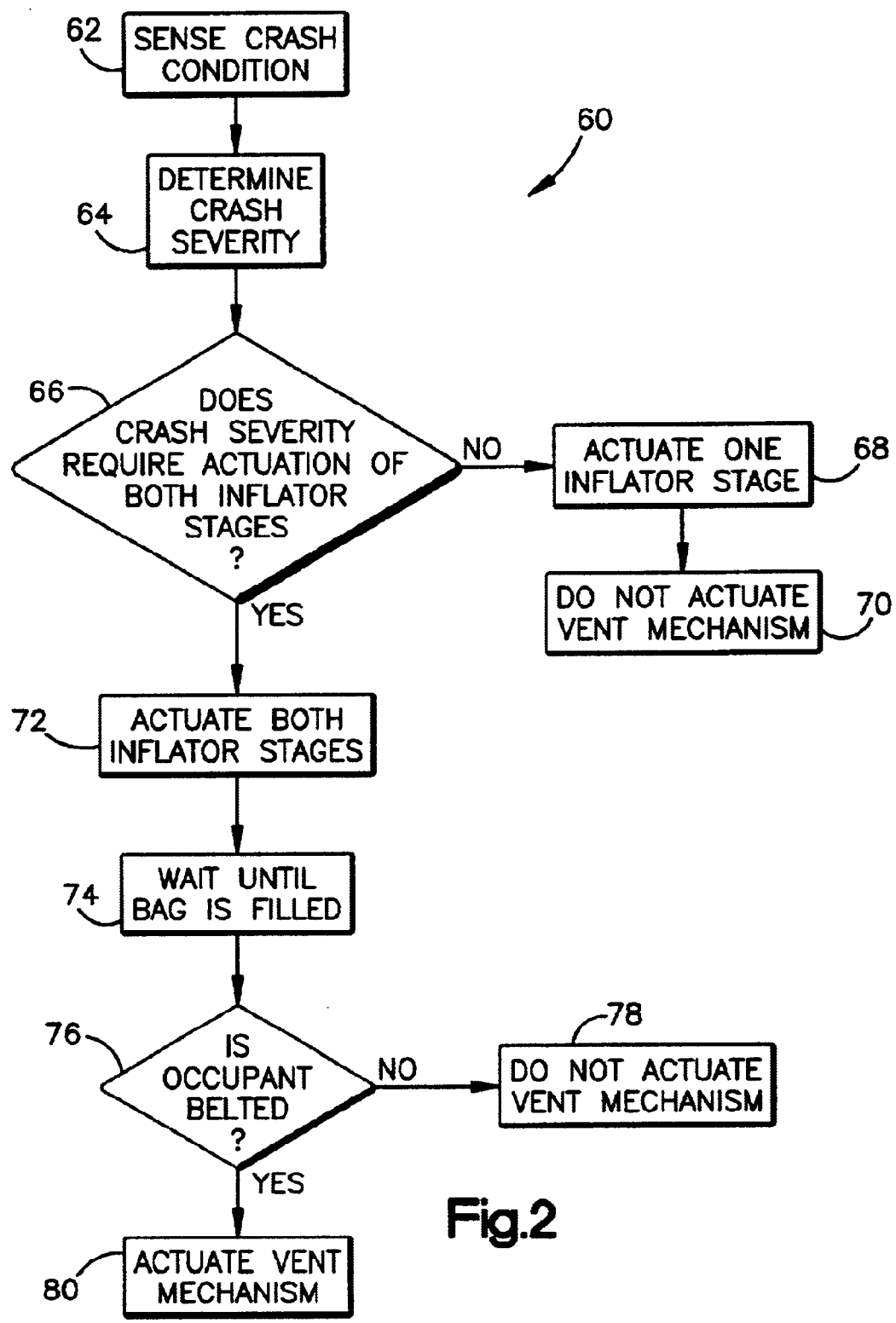
FIG. 2 is a flow chart of a process that is performed by the vehicle occupant protection apparatus of FIG. 1.

In a first embodiment of the invention, the controller 40 determines whether to actuate the vent mechanism 40 in accordance with a process 60 illustrated by the flow chart of FIG. 2.

In FIG. 2, the process 60 starts at Step 62 when a crash condition is sensed by the crash sensor 38. The output of the crash sensor 38 is sent to the controller 40. The controller 40 determines the severity of the crash condition at Step 64. The process 60 proceeds to Step 66, at which programmed instructions in the controller 40 determine whether the crash severity requires actuation of both stages 34 and 36 of the inflator 32.

If the determined crash severity does not require actuation of both stages 34 and 36 of the inflator 32, the process 60 proceeds to Step 68. The controller 40 actuates only one stage 34 or 36 of the inflator 32. Simultaneously, a determination is made at Step 70 that the vent mechanism 44 is not to be actuated.

As a result, inflation fluid from the inflator 32 is directed into the air bag 12 and the air bag inflates into a position between the steering wheel 14 and the vehicle seat 18, to help protect the occupant. Because the vent mechanism 44 is not actuated, inflation fluid is not vented from the reaction canister 30 through the vent mechanism.

If a determination is made at Step 66 that the crash severity requires actuation of both stages 34 and 36 of the inflator 32, the controller 40 at Step 72 actuates both stages of the inflator.

Thereafter, the process 60 proceeds to Step 74, at which no further action is taken until the air bag 12 is filled. Specifically, the controller 60 is programmed to wait a predetermined period of time after actuation of the inflator 34, at which time the air bag 12 is deemed to be filled. This period of time is determined as described below.

The process 60 then proceeds to Step 76, at which a determination is made as to whether the occupant of the seat 18 is belted. This determination is made on the basis of the output of the belt usage sensor 56.

If a determination is made at Step 76 that the occupant of the seat 18 is not belted, a determination is made at Step 78 that the vent mechanism 44 is not to be actuated. As a result, inflation fluid from the inflator 32 is directed into the air bag 12, and the air bag inflates into a position between the steering wheel 14 and the vehicle seat 18, to help protect the occupant. Because the vent mechanism 44 is not actuated, inflation fluid is not vented from the reaction canister 30 through the vent mechanism. The air bag 12 inflates with full force and pressure, as is desirable because the occupant is not belted.

If a determination is made at Step 76 that the occupant of the seat 18 is belted, a determination is made at Step 80 that the vent mechanism 44 is to be actuated. When the vent mechanism 44 is actuated, a portion of the inflation fluid that flows from the inflator 32 into the air bag 12, flows out of the reaction canister through the vent mechanism 44. This portion of the inflation fluid does not remain in the air bag 12 to inflate the air bag. As a result, the amount of inflation fluid flowing into the air bag 12, or the pressure of the inflation fluid, is reduced as compared to the amount or pressure of inflation fluid flowing into the air bag when the vent mechanism 44 remains unactuated. This change in the flow of inflation fluid can help to reduce or control the pressure of the inflation fluid in the inflated air bag 12.

Controlling venting of the reaction canister 30 in this manner has the benefit of helping to improve protection for both a belted occupant and an unbelted occupant. In some cases, the air bag 12 must inflate with sufficient force and pressure to help protect an unbelted occupant of the seat 18. This amount of force and pressure can be more than is required to help protect a belted occupant.

On the other hand, for some crash conditions, i.e., high severity crashes, the air bag 12 needs to fill quickly and completely because of the severity of the crash condition. It is necessary to actuate both stages 34 and 36 of the inflator 32 to fill the air bag 12 quickly and completely. Because the occupant is belted, however, the air bag 12 should vent as the occupant loads it because the full force and pressure of the air bag is not needed to help protect a belted occupant. Therefore, waiting until the air bag 12 is filled to vent the bag is desirable also. The goal is to have the air bag 12 completely inflated and in position against the occupant as soon as possible, with the desired amount of pressure in the air bag. If the venting of the air bag module 10 were to occur prior to the air bag 12 being filled, the air bag might not fill quickly enough. In general, the desired time for venting the air bag 12 is at the time of occupant contact. This may occur after the air bag is filled, or before.

The determination of whether the occupant is belted can be made prior to actuation of the inflator 32, or at the same time as actuation of the inflator, or after actuation of the inflator. It is desirable that the determination be made as late as possible in the process 60, so that the determination can be accurate at the time of the usage of the air bag 12 to help protect the occupant.

The controller 60 includes clock means 86 (FIG. 1) for determining the passage of a predetermined period of time after actuation of the inflator 32. The system 10 waits the predetermined period of time as determined by the clock means 86, then actuates the vent mechanism 44. The controller 40 may embody software such as a look-up table having different time periods as the solution for different combinations of factors—occupant position, seat belt usage, crash severity, etc.

Figure 3:
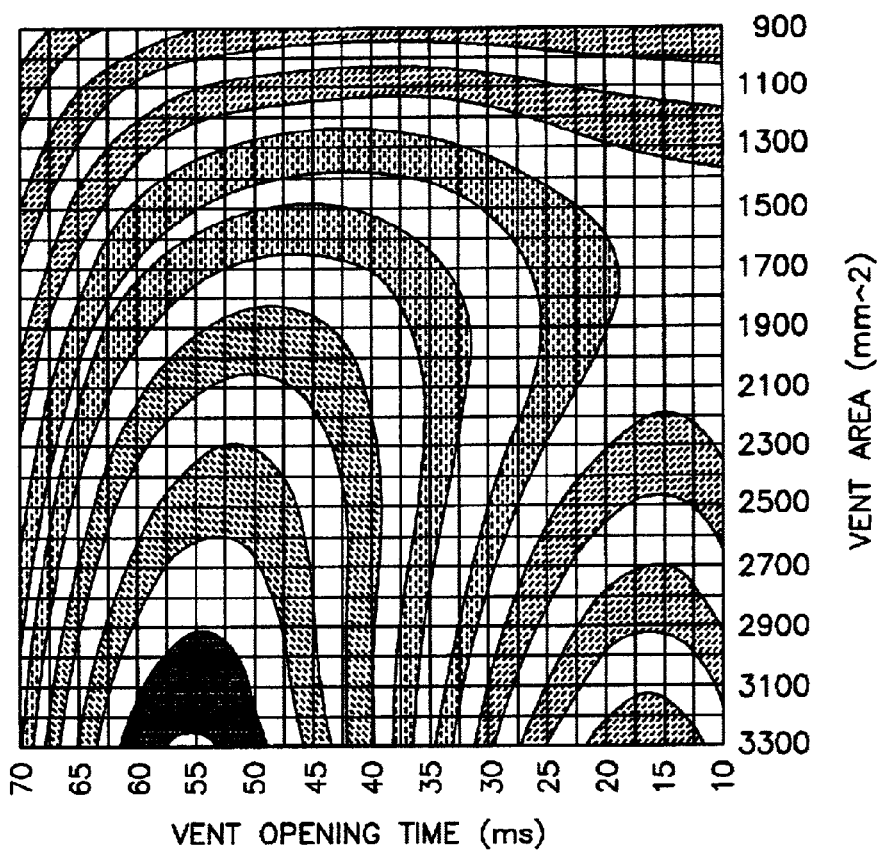
FIGS. 3 and 4 are graphical representations of the results of computer modeled tests of an occupant protection apparatus similar to the apparatus of FIG. 1.
Figure 4:
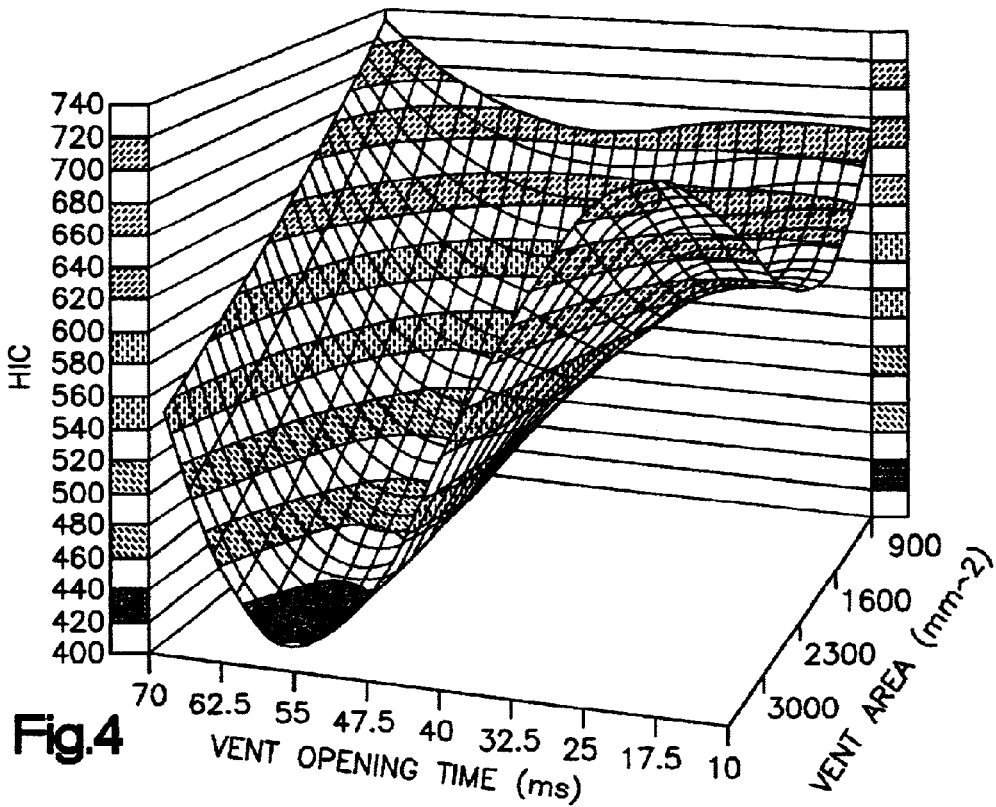

As an example of how the determination is made as to when to actuate the vent mechanism 44, FIGS. 3 and 4 are graphical depictions of the results of computer modeling of the module 10. In the modeled apparatus, the venting area of the vent mechanism is controllable, from 900 square millimeters to 3,300 square millimeters. The time of actuation of the vent mechanism (time of opening) is variable, from as early as 10 milliseconds after inflator actuation, to as late as 70 milliseconds after inflator actuation. These two variables are controllable individually, to provide test results with different combinations of the two variables. The air bag fills at about 40 milliseconds.

In FIG. 3, the time of actuation of the vent mechanism 44 (time of opening) is shown along the X axis, varying from 70 milliseconds after the crash event begins to 10 milliseconds after the crash event begins. The venting area of the vent mechanism 44 is shown on the Y axis, varying from 3,300 square millimeters to 900 square millimeters. HIC (head injury criteria) values are shown as areas of the graph having different fill patterns.

FIG. 4 is a three-dimensional graph of the same data. The time of actuation of the vent mechanism 44 (time of opening) is shown along the X axis. The venting area of the vent mechanism 44 is shown on the Y axis. HIC (head injury criteria) values are shown along the Z axis. Areas of the lowest HIC values are shown in FIGS. 3 and 4 with the darkest fill patterns. In addition, such areas are lowest on the Z axis in FIG. 4.

It can be seen that, per this model, the HIC values are lowest at a vent actuation time of about 55 milliseconds. This time is significantly after the bag fill time, which in the modeled system is 40–45 milliseconds after the crash event begins. The vent actuation time with the lowest HIC values will vary on the basis of the volume of the bag, the output of the inflator, vehicle crash characteristics, etc. It is believed that inflating the air bag fully as quickly as possible in a severe crash situation, then venting the bag from the module as needed based on seat belt usage and occupant position, provides a significant amount of protection.

In a second embodiment of the invention, the controller 40 determines whether to actuate the vent mechanism on the basis of occupant position. Thus, the system can determine (estimate) the time of contact of the occupant's head with the air bag, and initiate venting at that time. If the vent mechanism 44 is actuated (opens) before the occupant's head contacts the air bag, the amount of gas available in the gas for protection purposes would be reduced unnecessarily. If the vent mechanism 44 is actuated after the occupant's head contacts the air bag, the air bag would still be very stiff at the time of contact, providing less protection. Venting the bag at the time of occupant contact allows the occupant's head to ride the bag down.

Figure 5:
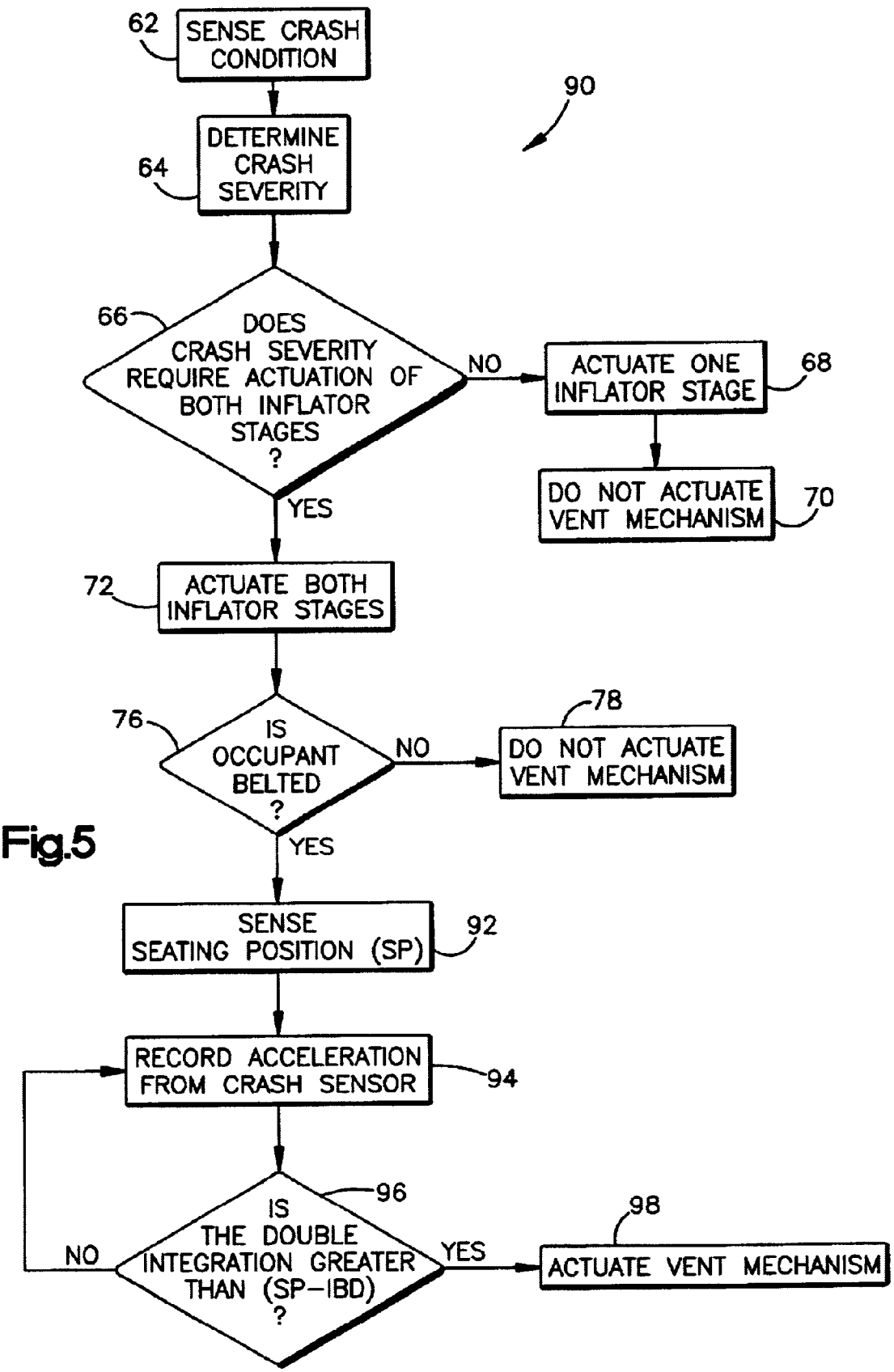
FIG. 5 is a flow chart, similar to FIG. 2, of a process in accordance with a second embodiment of the invention.

FIG. 5 is a flow chart of a process 90 showing operation of the controller 40 in accordance with the second embodiment of the invention. The process 90 is similar to the process 60 shown in FIG. 2. In general, Step 74, in which the vent is not actuated until the air bag is determined to be filled, is not performed. Instead, three Steps 92–96 are performed in which a determination is made as to when to actuate the vent mechanism 44 on the basis of, among other things, the output of the occupant position sensor mechanism. For example, if the occupant is relatively close to the steering wheel, the vent mechanism may be opened earlier in the process. If the occupant is relatively far from the steering wheel, the vent mechanism may be opened later, or not at all. An algorithm for making this determination is embodied in the controller 40.

In the process 90, at Step 92, the occupant position is sensed, by means of the occupant position sensor mechanism (FIG. 1) and, specifically, by means of the seat position sensor 58.

Figure 6:
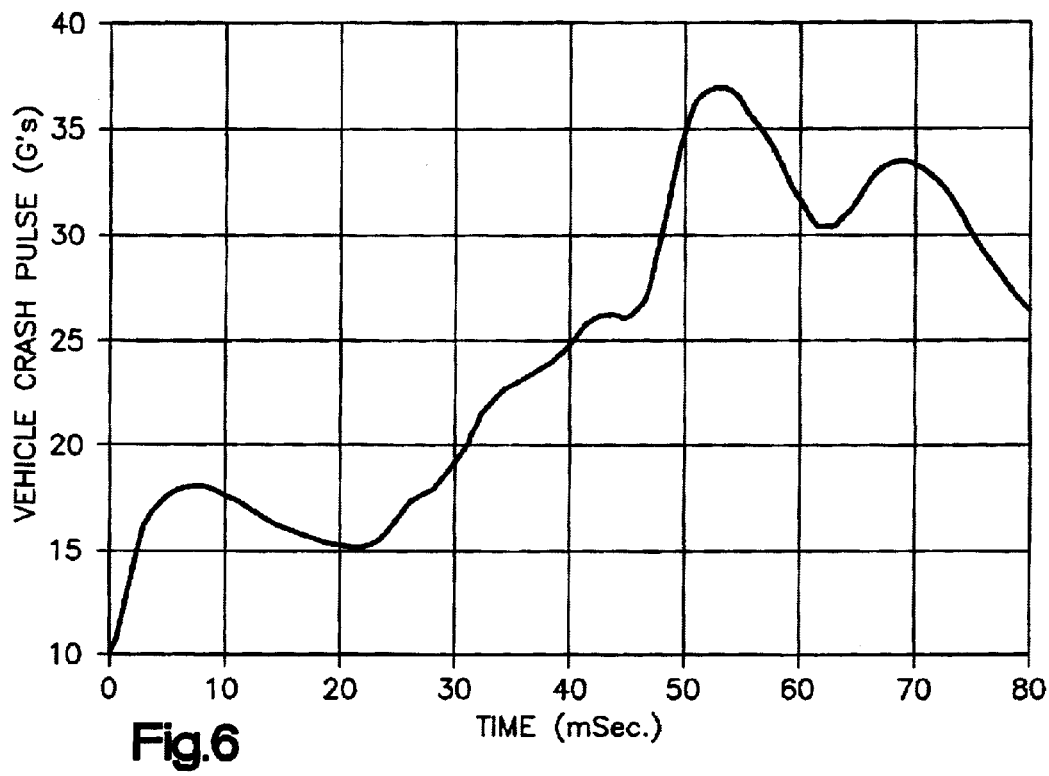
FIG. 6 is a graphical illustration that plots values of acceleration against time as used in making a determination in the process of FIG. 5.

At Step 94, the acceleration value from the crash sensor is recorded and integrated. Specifically, the instantaneous value of vehicle acceleration (deceleration) resulting from the crash condition is continuously recorded over the duration of the crash event. For one particular crash event, the results are shown in FIG. 6. In FIG. 6, the horizontal axis shows time in milliseconds from the beginning of the crash event, and the vertical axis is the instantaneous rate of acceleration of the vehicle, measured in g's.

Figure 7:
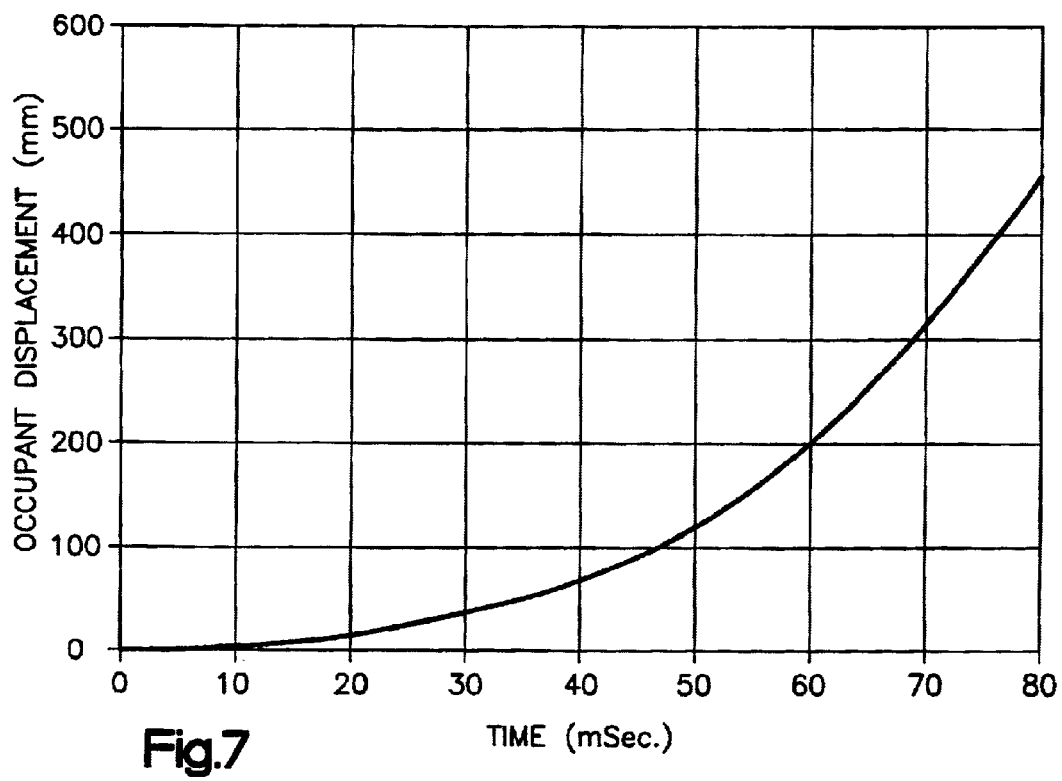
FIG. 7 is a graphical illustration that plots values of the double integral of acceleration against time as used in making a determination in the process of FIG. 5.

The instantaneous acceleration value is double integrated, to produce an instantaneous value of predicted occupant movement forward in the vehicle toward the steering wheel. This resultant value, for the particular crash event illustrated in FIG. 6, is shown in FIG. 7. In FIG. 7, the horizontal axis is time. Time zero is the time of the crash event. The inflator is actuated at about 15 milliseconds.

The vertical axis in FIG. 7 shows predicted amount of forward movement of a freely moving (non-restrained) vehicle occupant relative to the vehicle interior, over the illustrated duration of the crash event. This predicted amount of movement increases with time. For example, at the onset of the crash event, an unrestrained occupant will have moved zero millimeters toward the steering wheel. In the particular crash event shown in FIGS. 6 and 7, at 25 milliseconds, an unrestrained occupant will have moved about 30 millimeters toward the steering wheel. By the time 60 milliseconds have elapsed in that crash event, an unrestrained occupant will have moved about 200 millimeters toward the steering wheel.

The rate of increase of the double integration value is reflective of how fast the occupant is moving toward the vehicle steering wheel. If the crash severity is relatively high, the rate of vehicle deceleration (FIG. 6) is greater, and the double integration value (FIG. 7) increases in magnitude relatively quickly—the occupant moves toward the steering wheel more quickly. In contrast, if the crash severity is relatively low, the rate of vehicle deceleration (FIG. 6) is lower, and the double integration value (FIG. 7) increases in magnitude relatively slowly—the occupant moves toward the steering wheel more slowly.

At Step 96, a determination or calculation is made as to the value of the term (SP minus IBD). "SP" refers to occupant seating position, as sensed by the seat position sensor, and is measured as the distance between the occupant and the vehicle steering wheel. In the embodiment shown, SP is 275 millimeters for a fully forward seat, 400 millimeters for a mid-position seat, and 525 millimeters for a fully rearward seat. "IBD" refers to "inflated bag depth", and is a given number for each air bag module—in this particular instance, 275 millimeters.

The calculated (or predicted) value of (SP minus IBD), in millimeters, reflects how far away the occupant would be from the fully inflated air bag at the onset of the crash event. A positive value for (SP minus IBD) indicates that the occupant, at the onset of the crash event, is in a position relative to the steering wheel at which the occupant is not in contact with the air bag—that is, rearward of a fully inflated air bag. For example, if the seat is fully rearward, SP is 525, and the value of (SP minus IBD) is 250, indicating that the occupant is 250 millimeters away from a fully inflated air bag at the onset of the crash event.

In contrast, if the seat is fully forward, SP is 275, and the value of (SP minus IBD) is 0 millimeters, indicating that the occupant would be in contact with a fully inflated air bag at the onset of the crash event.

Also at Step 96, a determination is made as to whether the double integration value (shown in FIG. 7) is greater than the value of (SP minus IBD). In effect, this determination (a) notes how fast the occupant is assumed to be closing the initial distance to the steering wheel or air bag (double integration value) as a result of deceleration in this particular crash event; (b) notes the initial distance of the occupant from an inflated air bag (SP minus IBD); and (c) compares those two to calculate when the original starting distance would be closed (double integration value minus (SP minus IBD)=zero).

If the result of the determination at Step 96 is negative, the vent mechanism is not actuated, because the negative result signifies that the occupant has not yet contacted the air bag. With a belted occupant, there is no need to vent inflation fluid until the occupant is in contact with the air bag. Instead, the process loops back to Step 94.

As one example, if the seat is fully rearward, the value of (SP minus IBD) is 525 minus 275, or 250 millimeters. In the crash event shown in FIGS. 6 and 7, therefore, the calculated value of (double integration value minus (SP minus IBD)) does not become positive until the double integration value increases to 250 millimeters. In this particular crash event, that does not occur until about 64 milliseconds from onset. Therefore, until the double integration value increases to 250 at about 64 milliseconds, the vent mechanism is not actuated. Initially, therefore, the air bag 12 inflates with full force and pressure.

The determination at Step 96 is thereafter made continually and repeatedly over the duration of the crash event. Because the crash acceleration curve can change during the crash event, repeating the calculation with the new crash information is appropriate. Also, if occupant position is sensed continuously during the crash event, for example with the occupant ranging sensor 59, the calculation can be repeated with the new occupant position information.

In the foregoing example in which the seat (and therefore the occupant) is fully rearward, the double integration value reaches 250 millimeters at about 64 milliseconds from time zero. At that time, the determination at Step 96 becomes positive, and the process proceeds to Step 98, at which the vent mechanism is actuated.

As another example, if the seat is in the midrange position, the value of (SP minus IBD) is 400 minus 275, or 125 millimeters. In the crash event shown in FIGS. 6 and 7, the calculated value of (double integration value minus (SP minus IBD)) does not become positive until the double integration value excess 125 millimeters. In this posited crash event, that occurs at about 50 milliseconds from onset. Therefore, the determination at Step 96 does not become positive, and the vent mechanism is not actuated, until about 50 milliseconds from time zero.

As yet another example, if the seat is in the full forward position, the value of (SP minus IBD) is 275 minus 275, or 0 millimeters. In the crash event shown in FIGS. 6 and 7, the calculated value of (double integration value minus (SP minus IBD)) equals zero, immediately at time zero. Therefore, the determination at Step 96 becomes positive immediately after time zero, and the vent mechanism 44 is actuated at Step 98. This is reflective of the fact that the occupant is presumably seated fully forward relative to the steering wheel, and the occupant's head will contact the air bag immediately upon inflation. The air bag should therefore be inflated with less force and pressure, starting at crash onset—that is, the reaction canister or the air bag 12 or other portion of the apparatus 10 should be vented immediately, even though the occupant is belted.

In a third embodiment of the invention, the controller 40 determines whether to actuate the vent mechanism directly on the basis of sensed occupant position, rather than indirectly on the basis of seat position. Thus, knowing the occupant's position and the rate of inflation of the air bag, the system can determine directly the time of contact of the occupant's head with the air bag, and initiate venting at that time.

FIG. 8 is a flow chart, similar to FIG. 5, of a process 100 showing operation of the controller 40 in accordance with the third embodiment of the invention. The process 100 is similar to the process 90 shown in FIG. 5, up through the steps 76 and 78.

In the process 100, at Step 102, the occupant position (OP) is sensed by means of the occupant ranging sensor 59 (FIG. 1). A value is provided that is indicative of the distance between the occupant and the steering wheel. This distance decreases during the course of the crash event, as vehicle deceleration causes the occupant to move closer to the steering wheel.

At Step 104, the occupant position is compared to the inflated bag depth (IBD, as discussed above). This determination reflects how far away the occupant is from the fully inflated air bag. If the determination is made that OP is greater than IBD, that is, that the occupant is farther from the steering wheel than the distance of a fully inflated air bag, then the vent mechanism is not actuated. This is because the negative result signifies that the occupant has not yet moved far enough forward in the vehicle to have contacted the inflated air bag. With a belted occupant, there is no need to vent inflation fluid until the occupant is in contact with the inflated air bag. Instead, the process loops back to Step 102.

The determination at Step 104 is thereafter made continually and repeatedly over the duration of the crash event. When the sensed position of the occupant is such that the distance between the occupant and the steering wheel (OP) is no longer greater than the inflated bag depth (IBD), the system assumes at step 104 that the occupant is in contact with the inflated air bag, and the vent mechanism is actuated at step 106.

From the above description of the invention, those skilled in the art will perceive improvements, changes and modifications in the invention. For example, the double integration of crash acceleration may be replaced with a calculation based on either (a) a Kalman filter (estimation/correction estimation) with crash acceleration and occupant sensing measurements (during the crash) as inputs, or (b) a complex Madymo model with crash acceleration as input. Such improvements, changes and modifications within the skill of the art are intended to be covered by the appended claims.

Having described the invention, I claim:

1. A vehicle occupant protection apparatus comprising:
   a seat belt system for helping to protect an occupant of a vehicle seat, said seat belt system having a buckled condition and an unbuckled condition;
   means for determining the buckled condition of said seat belt system;
   an inflatable vehicle occupant protection device having a deflated condition and an inflated condition for helping to protect the occupant of the vehicle seat;
   an inflator actuatable to provide inflation fluid to inflate said inflatable device;
   means for determining that said inflatable device has been inflated into the inflated condition;
   an electrically energizable mechanism for venting inflation fluid from said inflatable device; and
   vehicle electric circuitry for actuating said electrically energizable mechanism to vent inflation fluid from said inflatable device when said seat belt system is determined to be in the buckled condition and after said inflatable device has been determined to have reached the inflated condition.

2. An apparatus as set forth in claim 1 wherein said inflator is a dual stage inflator having first and second independently actuatable stages, said vehicle electric circuitry being responsive to actuate said electrically energizable mechanism only in response to actuation of both stages of said inflator.

3. A vehicle occupant protection apparatus comprising:
   a seat belt system for helping to protect an occupant of a vehicle seat, said seat belt system having a buckled condition and an unbuckled condition;
   means for determining the buckled condition of said seat belt system;
   an inflatable vehicle occupant protection device having a deflated condition and an inflated condition for helping to protect the occupant of the vehicle seat;
   an inflator actuatable to provide inflation fluid to inflate said inflatable device;
   means for determining the inflated condition of said inflatable device;
   an electrically energizable mechanism for venting inflation fluid from said protection apparatus; and
   vehicle electric circuitry, responsive to a determination of the buckled condition of said seat belt system and the inflated condition of said inflatable device, for actuating said electrically energizable mechanism to vent inflation fluid from said protection apparatus,
   wherein said means for determining the inflated condition of said inflatable device comprises clock means for determining the passage of a predetermined period of time after actuation of said inflator.

4. An apparatus as set forth in claim 3 including a controller, said controller including said means for determining the inflated condition of said inflatable device, said controller including said vehicle electric circuitry for actuating said electrically energizable mechanism to vent inflation fluid from said protection apparatus.

5. An apparatus as set forth in claim 1 comprising a reaction canister for said protection device, said electrically energizable mechanism being actuatable to vent inflation fluid from said inflation device through said reaction canister.

6. An apparatus as set forth in claim 1 wherein said means for determining the buckled condition of said seat belt system comprises a sensor on said seat belt system operative to output a signal indicative of the buckled condition of said seat belt system.

7. An apparatus as set forth in claim 1 further including means for sensing occupant position relative to said reaction canister, and wherein said vehicle electric circuitry is responsive to a determination of occupant position for actuating said electrically energizable mechanism to vent inflation fluid from said protection apparatus.

8. An apparatus as set forth in claim 7 wherein a determination is made whether and when to actuate said electrically energizable mechanism on the basis of sensed occupant position.

9. A vehicle occupant protection apparatus comprising:
   a seat belt system for helping to protect an occupant of a vehicle seat, said seat belt system having a buckled condition and an unbuckled condition;
   means for determining the buckled condition of said seat belt system;
   an inflatable vehicle occupant protection device having a deflated condition and an inflated condition for helping to protect the occupant of the vehicle seat;
   an inflator actuatable to provide inflation fluid to inflate said inflatable device;
   means for determining the inflated condition of said inflatable device;
   an electrically energizable mechanism for venting inflation fluid from said protection apparatus;
   vehicle electric circuitry, responsive to a determination of the buckled condition of said seat belt system and the inflated condition of said inflatable device, for actuating said electrically energizable mechanism to vent inflation fluid from said protection apparatus; and
   means for sensing occupant position relative to said reaction canister, and wherein said vehicle electric circuitry is responsive to a determination of occupant position for actuating said electrically energizable mechanism to vent inflation fluid from said protection apparatus, wherein a determination is made whether and when to actuate said electrically energizable mechanism on the basis of sensed occupant position, wherein said inflator is a dual stage inflator having first and second independently actuatable stages, said vehicle electric circuitry being responsive to actuate said electrically energizable mechanism only in response to actuation of both stages of said inflator, and wherein said means for determining the inflated condition of said inflatable device comprises clock means for determining the passage of a predetermined period of time after actuation of said inflator.

10. An apparatus as set forth in claim 7 further including a crash sensor operative to provide an output signal indicative of vehicle deceleration, said vehicle electric circuitry being operative to calculate or predict occupant movement toward said reaction canister on the basis of the output signal of said crash sensor and to compare calculated or predicted occupant movement with sensed occupant position in determining actuation of said electrically energizable mechanism.

11. A vehicle occupant protection apparatus comprising:
a seat belt system for helping to protect an occupant of a vehicle seat, said seat belt system having a buckled condition and an unbuckled condition;
means for determining the buckled condition of said seat belt system;
an inflatable vehicle occupant protection device having a deflated condition and an inflated condition for helping to protect the occupant of the vehicle seat;
an inflator actuatable to provide inflation fluid to inflate said inflatable device;
means for determining the inflated condition of said inflatable device;
an electrically energizable mechanism for venting inflation fluid from said protection apparatus;
vehicle electric circuitry, responsive to a determination of the buckled condition of said seat belt system and the inflated condition of said inflatable device, for actuating said electrically energizable mechanism to vent inflation fluid from said protection apparatus;
means for sensing occupant position relative to said reaction canister, and wherein said vehicle electric circuitry is responsive to a determination of occupant position for actuating said electrically energizable mechanism to vent inflation fluid from said protection apparatus; and
a crash sensor operative to provide an output signal indicative of vehicle deceleration over time, said vehicle electric circuitry being operative to calculate or predict occupant movement toward said reaction canister on the basis of the output signal of said crash sensor and to compare calculated or predicted occupant movement with sensed occupant position in determining actuation of said electrically energizable mechanism,
wherein said inflator is a dual stage inflator having first and second independently actuatable stages, said vehicle electric circuitry being responsive to actuate said electrically energizable mechanism only in response to actuation of both stages of said inflator, and wherein said means for determining the inflated condition of said inflatable device comprises clock means for determining the passage of a predetermined period of time after actuation of said inflator.

12. A vehicle occupant protection apparatus comprising:
a seat belt system for helping to protect an occupant of a vehicle seat, said seat belt system having a buckled condition and an unbuckled condition;
means for determining the buckled condition of said seat belt system;
an inflatable vehicle occupant protection device having a deflated condition and an inflated condition for helping to protect the occupant of the vehicle seat;
an inflator actuatable to provide inflation fluid to inflate said inflatable device;
means for determining the inflated condition of said inflatable device;
an electrically energizable mechanism for venting inflation fluid from said protection apparatus; and
vehicle electric circuitry, responsive to a determination of the buckled condition of said seat belt system and the inflated condition of said inflatable device, for actuating said electrically energizable mechanism to vent inflation fluid from said protection apparatus,
said inflator being a dual stage inflator having first and second independently actuatable stages, said vehicle electric circuitry being responsive to actuate said electrically energizable mechanism only in response to actuation of both stages of said inflator;
wherein said means for determining the inflated condition of said inflatable device comprises clock means for determining the passage of a predetermined period of time after actuation of said inflator; and
wherein said apparatus includes a controller, said controller including said means for determining the inflated condition of said inflatable device, said controller including said vehicle electric circuitry for actuating said electrically energizable mechanism to vent inflation fluid from said protection apparatus.

13. An apparatus as set forth in claim 12 further including means for sensing occupant position relative to said reaction canister, and wherein said vehicle electric circuitry is responsive to a determination of occupant position for actuating said electrically energizable mechanism to vent inflation fluid from said protection apparatus.

14. An apparatus as set forth in claim 13 wherein a determination is made whether and when to actuate said electrically energizable mechanism on the basis of sensed occupant position.

15. An apparatus as set forth in claim 14 further including a crash sensor operative to provide an output signal indicative of vehicle deceleration over time, said vehicle electric circuitry being operative to calculate or predict occupant movement toward said reaction canister on the basis of the output signal of said crash sensor and to compare calculated or predicted occupant movement with sensed occupant position in determining actuation of said electrically energizable mechanism.

16. A vehicle occupant protection apparatus comprising:
a seat belt system for helping to protect an occupant of a vehicle seat, said seat belt system having a buckled condition and an unbuckled condition;
means for determining the buckled condition of said seat belt system;
an inflatable vehicle occupant protection device having a deflated condition and an inflated condition for helping to protect the occupant of the vehicle seat;
an inflator actuatable to provide inflation fluid to inflate said inflatable device;
an electrically energizable mechanism for venting inflation fluid from said inflatable device;

a crash sensor operative to provide output signals, each output signal having a value that is indicative of vehicle deceleration; and vehicle electric circuitry being responsive to a determination of the buckled condition of said seat belt system for actuating said electrically energizable mechanism to vent inflation fluid from said inflatable device after said inflatable device has been inflated into the inflated condition;

said vehicle electric circuitry being operative to calculate or predict occupant movement toward said inflatable device on the basis of the output signals of said crash sensor and to determine when the occupant will contact said inflatable device when said inflatable device is in the inflated condition, said vehicle electric circuitry controlling actuation of said electrically energizable mechanism based upon a determination of when the occupant will contact said inflatable device.

17. An apparatus as set forth in claim 16 wherein said vehicle electric circuitry comprises means for integrating said vehicle deceleration signal value to provide a value that is indicative of predicted occupant movement toward said inflatable device.

18. An apparatus as set forth in claim 17 wherein said vehicle electric circuitry comprises means for comparing the inflated depth of said inflatable device with predicted occupant movement toward said inflatable device to determine time of occupant contact with said inflatable device.

19. An apparatus as set forth in claim 17 wherein said vehicle electric circuitry comprises means for determining time of occupant engagement with said inflatable device and means for actuating said electrically actuatable mechanism at the time of occupant contact with said inflatable device.

20. A method for helping to protect an occupant of a vehicle seat having an associated seat belt system with a buckled condition and an unbuckled condition and having an associated inflatable protection device with an inflated condition and a deflated condition, said method comprising the steps of:

inflating the protection device;

determining the buckled condition of the seat belt system;

determining the inflated condition of the protection device; and venting inflation fluid from the protection device in response to a determination of the buckled condition of the seat belt system and a determination that the protection device has been inflated.

21. A method as set forth in claim 20 further including the steps of:

sensing vehicle deceleration over time and providing an output signal having a value that is indicative of vehicle deceleration over time;

inflating the protection device in response to sensing vehicle deceleration in excess of a threshold value; and calculating occupant movement toward the protection device in response to vehicle deceleration, on the basis of the output signal.

22. A method as set forth in claim 21 wherein said calculating step includes the step of double integrating the output signal.

23. A method as set forth in claim 20 further including the step of predicting a time of engagement of the occupant with the inflated protection device, and wherein said venting step includes venting inflation fluid at the predicted time of engagement.

24. A method as set forth in claim 21 wherein said predicting step includes comparing calculated occupant movement with sensed occupant position.

25. A method as set forth in claim 23 wherein said predicting step includes determining occupant position in the vehicle relative to the inflatable device when the inflatable device is in the deflated condition.

26. A method for helping to protect an occupant of a vehicle seat having an associated seat belt system with a buckled condition and an unbuckled condition and having an associated inflatable protection device with an inflated condition and a deflated condition, said method comprising the steps of:

determining occupant position in the vehicle relative to the inflatable device when the inflatable device is in the deflated condition;

sensing vehicle deceleration and providing an output signal having a value that is indicative of vehicle deceleration;

inflating the protection device in response to sensing vehicle deceleration in excess of a threshold value;

calculating occupant movement toward the protection device in response to vehicle deceleration, on the basis of the output signal;

predicting a time of engagement of the occupant with the inflated protection device by comparing calculated occupant movement with determined occupant position;

determining the buckled condition of the seat belt system;

determining the inflated condition of the protection device; and venting inflation fluid from the protection device at the predicted time of engagement in response to a determination of the buckled condition of the seat belt system and a determination that the protection device is in the inflated condition.

27. A method as set forth in claim 26 wherein said calculating step includes double integrating the output signal.

28. A method for helping to protect an occupant of a vehicle seat having an associated seat belt system with a buckled condition and an unbuckled condition and having an associated inflatable protection device inflatable by an inflator to an inflated condition, said method comprising the steps of:

actuating the inflator for inflating the protection device;

determining the buckled condition of the seat belt system;

determining occupant position;

predicting or calculating a time of engagement of the occupant with the protection device when the protection device is in the inflated condition; and venting inflation fluid from the protection device at the predicted time of engagement in response to a determination of the buckled condition of the seat belt system.

29. A method as set forth in claim 28 wherein said step of determining occupant position includes sensing occupant position with an occupant ranging sensor.

30. A method as set forth in claim 28 wherein said step of determining occupant position includes sensing the position of the vehicle seat.

31. A method as set forth in claim 28 including the step of comparing occupant position with inflated bag depth and venting inflation fluid when occupant position is determined to be less than inflated bag depth.

* * * * *